(12) United States Patent
Wanninger et al.

(10) Patent No.: US 7,329,627 B2
(45) Date of Patent: Feb. 12, 2008

(54) CE/CU/MN-CATALYSTS

(75) Inventors: Klaus Wanninger, Ampfing (DE);
Jürgen Koy, Grosskarolinenfeld (DE);
Albert Chigapov, Aachen (DE);
Angelika Heinzel, Freiburg (DE); Peter Hübner, Freiburg (DE); Alexander Susdorf, Freiburg (DE)

(73) Assignees: Sud-Chemie AG, Munich (DE);
Ford-Werke AG, Koln-Niehl (DE);
Fraunhofer-Gesellschaft zur Forderung der Angewandten Forschunge E.V., Munich (DE)

( * ) Notice: Subject to any disclaimer, the term of this patent is extended or adjusted under 35 U.S.C. 154(b) by 654 days.

(21) Appl. No.: 10/704,477

(22) Filed: Nov. 7, 2003

(65) Prior Publication Data
US 2004/0151647 A1    Aug. 5, 2004

(30) Foreign Application Priority Data
Nov. 8, 2002  (DE) ................... 102 52 103

(51) Int. Cl.
*B01J 23/10* (2006.01)
(52) U.S. Cl. ..................................... 502/304
(58) Field of Classification Search ............... 502/304
See application file for complete search history.

(56) References Cited

U.S. PATENT DOCUMENTS 3,914,389 A    10/1975  Haacke
3,923,690 A *  12/1975  Vogt et al. ................. 502/184
4,212,854 A *   7/1980  Maki et al. ................. 423/247
4,968,656 A *  11/1990  Fukuda et al. ............. 502/244
5,271,916 A    12/1993  Nguyen
5,821,185 A    10/1998  White
5,977,017 A    11/1999  Golden
6,037,514 A     3/2000  White
6,060,420 A     5/2000  Kaneko
6,281,403 B1    8/2001  White
6,913,739 B2 *  7/2005  Shore et al. ................ 423/247

FOREIGN PATENT DOCUMENTS

| JP | 11104491     | 4/1999 |
| JP | 2001000841   | 1/2001 |
| WO | WO 95/03877  | 2/1995 |

OTHER PUBLICATIONS

R. Farrauto, Catalysis Today, 62, 2000, 249-254.
Avgouropoulos, et al., Catalysis Letters 73(1), (2001), 33-40.
J. Zhang, et al., Chem. Lett. 9 (9), 1998, 873-876.
A. N. Shigapov, et al., Europa Cat-IV, Rimini, Italy, Sep. 1999, Book of Abstracts, 838.

* cited by examiner

*Primary Examiner*—Stuart Hendrickson
(74) *Attorney, Agent, or Firm*—Scott R. Cox

(57) ABSTRACT

Disclosed is a mixed oxide catalyst, preferably for selective oxidation of CO in hydrogen rich gas mixtures, or in oxygen containing gas mixtures in the presence of water and carbon dioxide, comprising about 15 to 30 at.-% Cu, about 55 to 77 at.-% Mn and about 7.5 to 10 at.-% Ce.

26 Claims, 11 Drawing Sheets

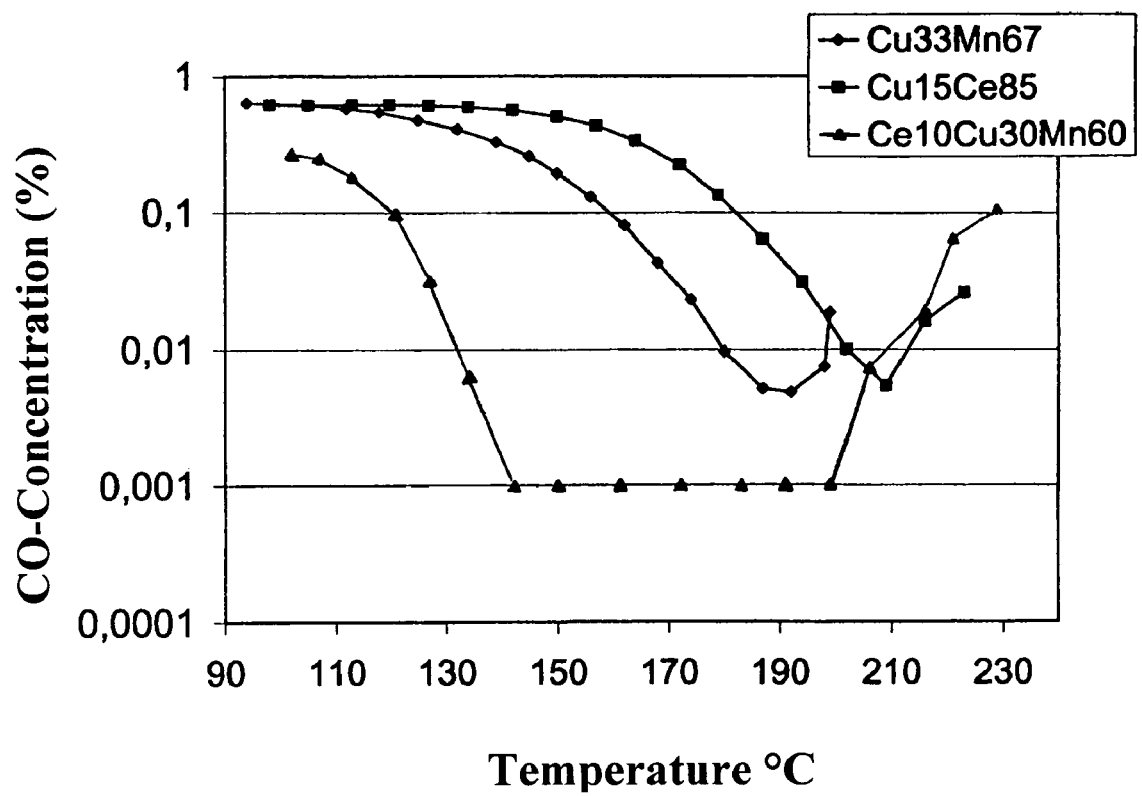
Fig. 1: Comparison of the activity (CO-concentration) of Cu/Ce-, Cu/Mn- and Cu/Ce/Mn-mixed oxide catalysts.

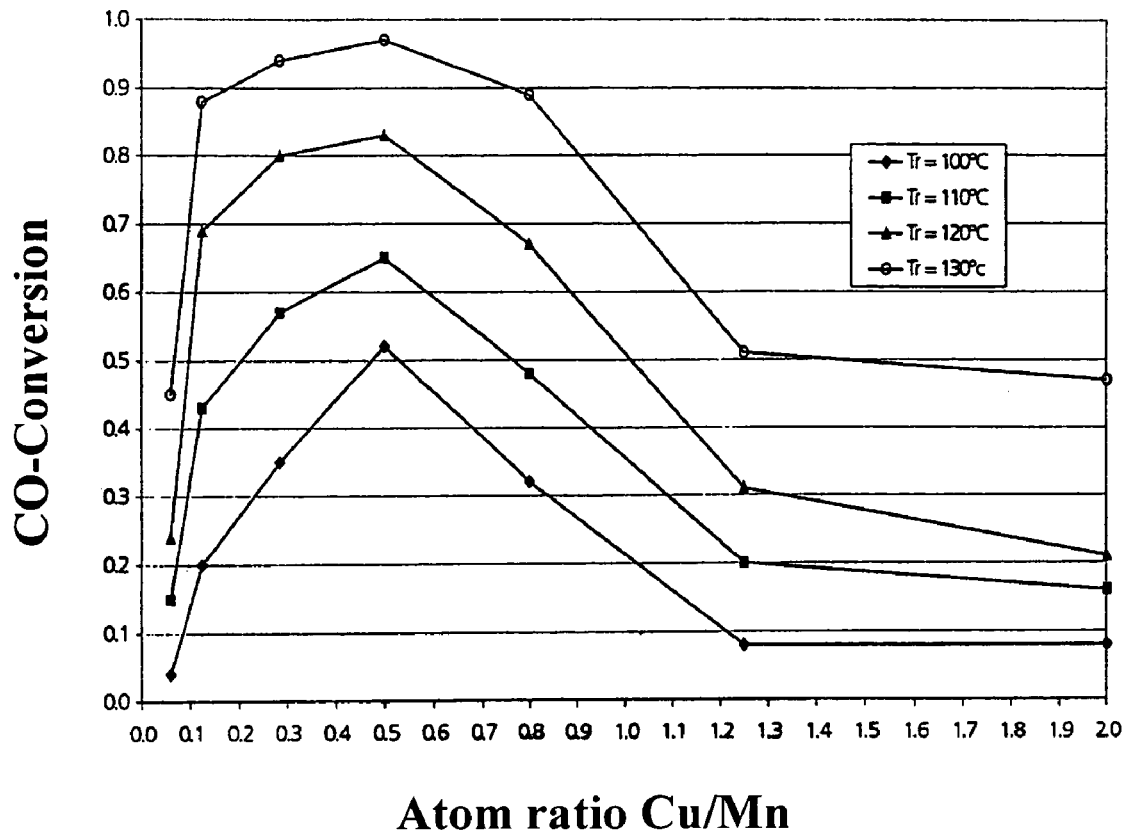
Fig. 2: Comparison of the activity (CO-conversion) of Cu/Ce/Mn mixed oxide catalysts having fixed Ce concentration of 10 at.-% and different Cu/Mn ratios at different reaction temperatures.

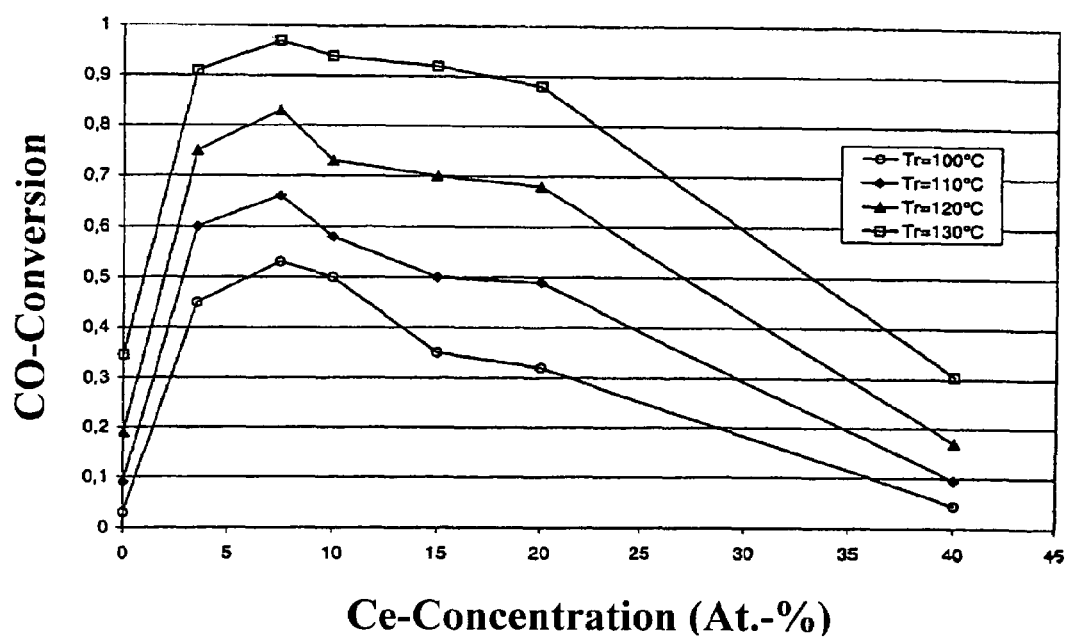
Fig. 3: CO-conversion over Cu/Ce/Mn catalysts with constant atomic ratio Cu/Mn of 1 : 2 as a function of Ce concentration at four different reaction temperatures.

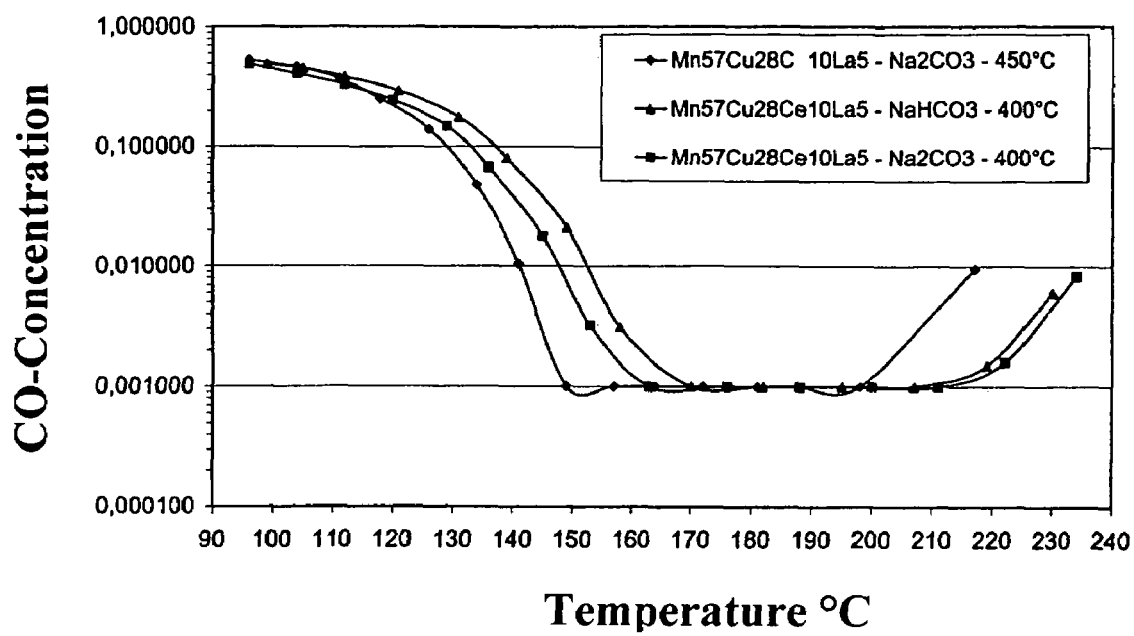
Fig. 3b: CO-concentration over Mn/Cu/Ce/La mixed oxide catalysts (precipitation with $NaHCO_3$ and $Na_2CO_3$, respectively).

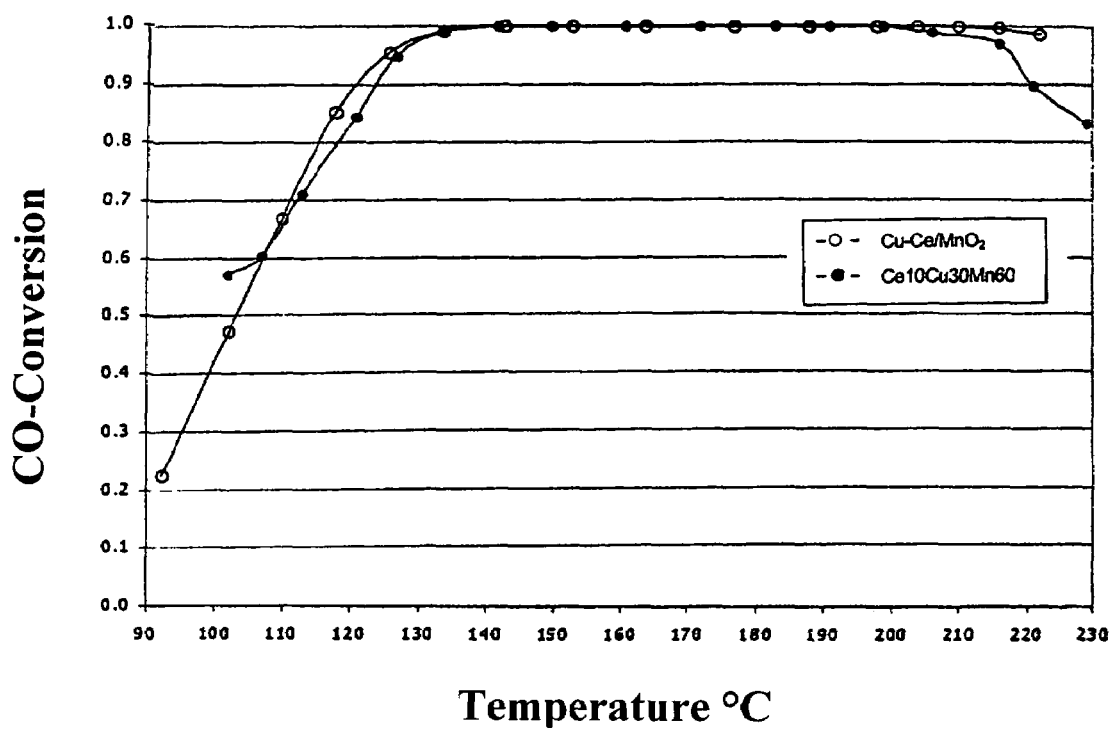
Fig. 4: The CO-oxidation activity of Cu/Ce/Mn mixed oxide catalysts having the same composition, but prepared by different methods.

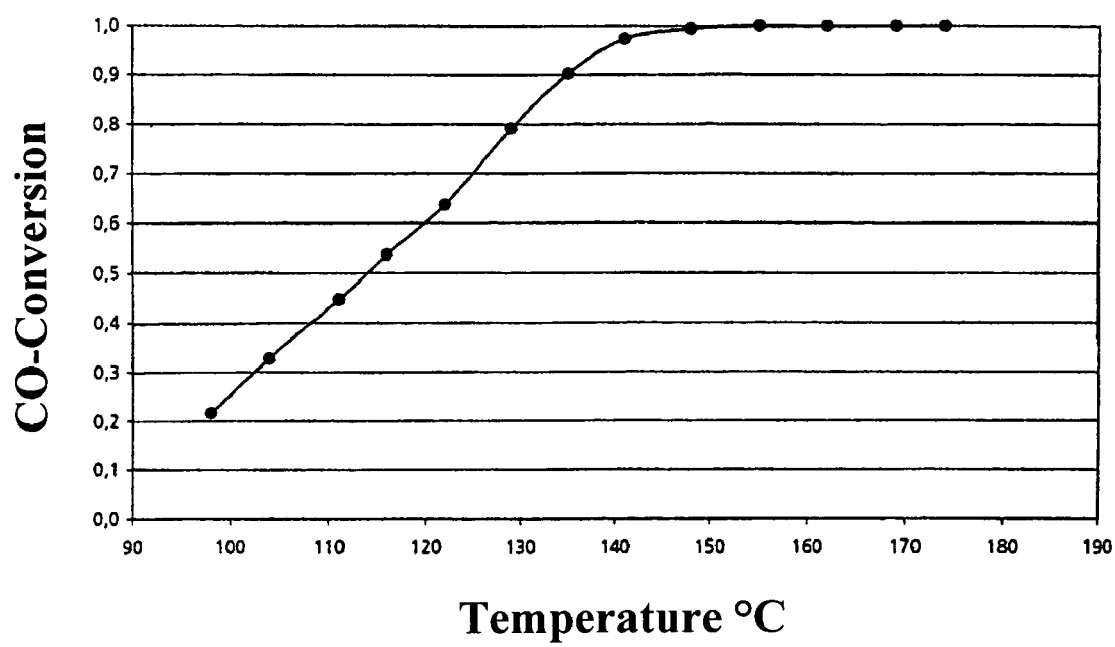
Fig. 5: CO-conversion as a function of temperature of a catalyst with the composition 20 wt.-% $(Ce_{10}Cu_{30}Mn_{60})/ZrO_2$

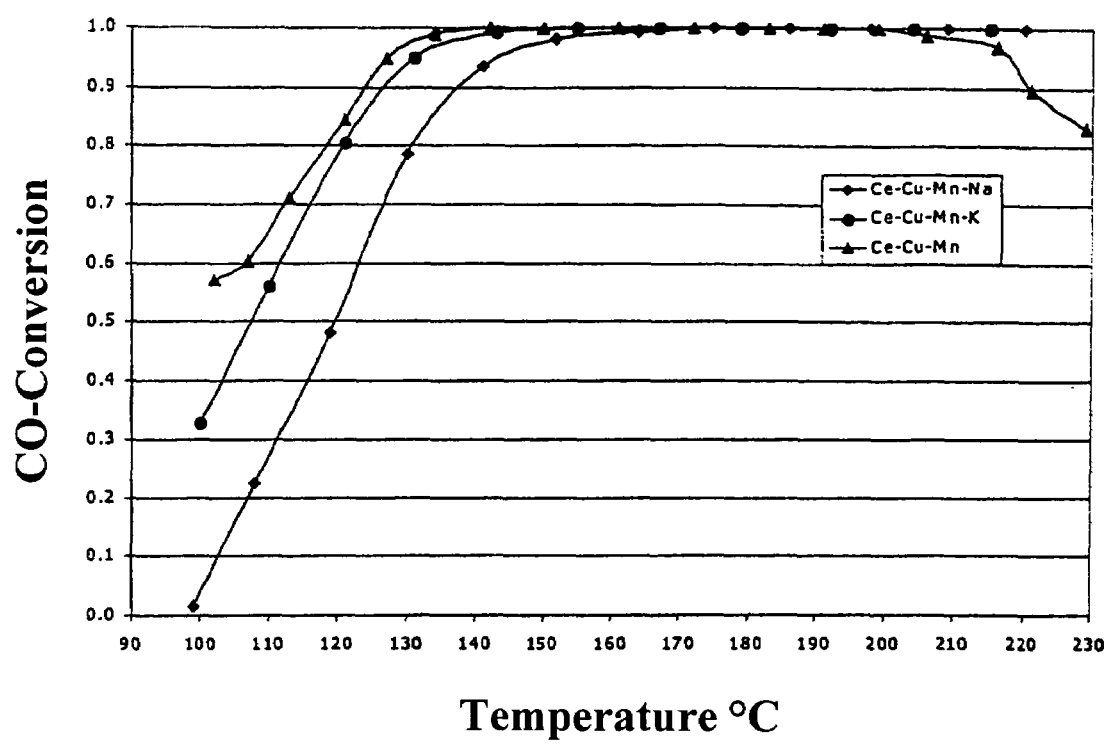
Fig. 6: CO-oxidation activity of various catalysts in dependency of the temperature.

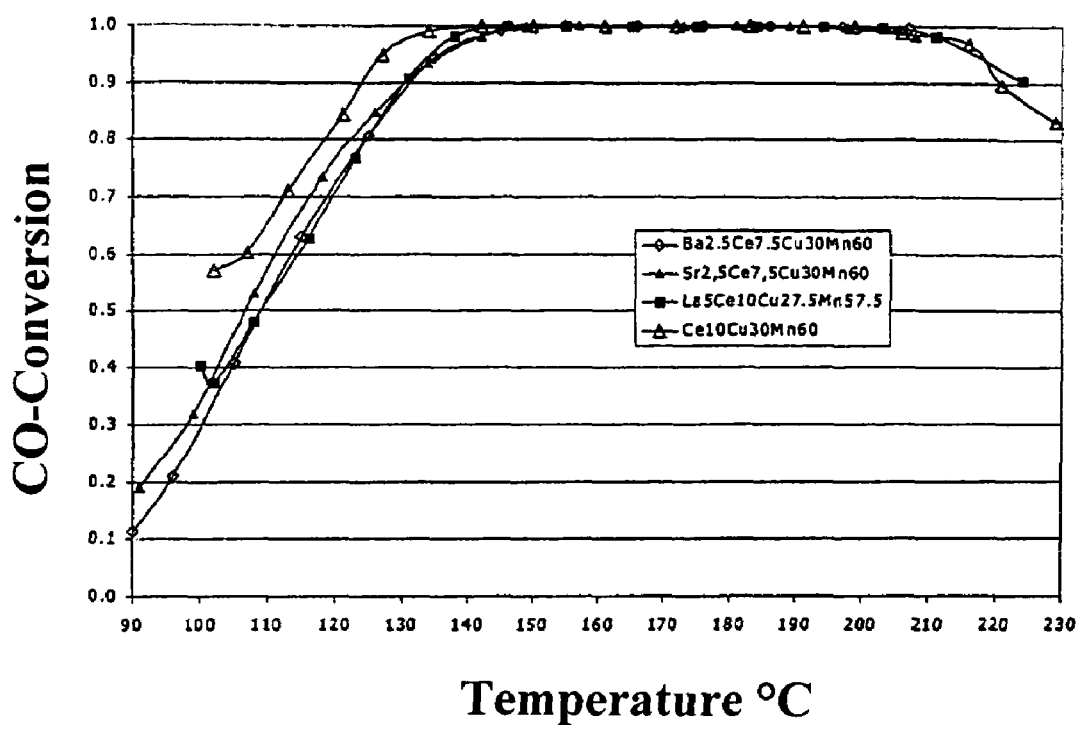
Fig. 7: The activity in CO-oxidation of various catalysts in dependency of the temperature.

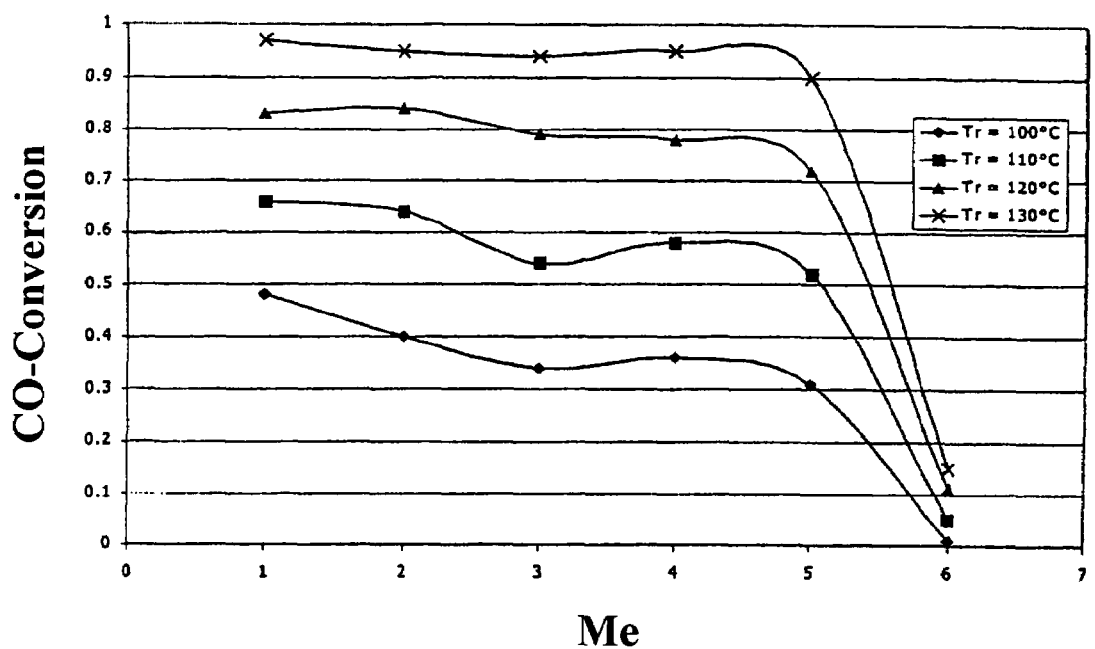
Fig. 8: The effect of partial exchange of Cu to other transition metals ($Ce_{10}Cu_{20}(Me)_{10}Mn_{60}$; Me: 1-Cu, 2-Co, 3-Ni, 4-Fe, 5-Zn, 6-Cr) at different temperatures.

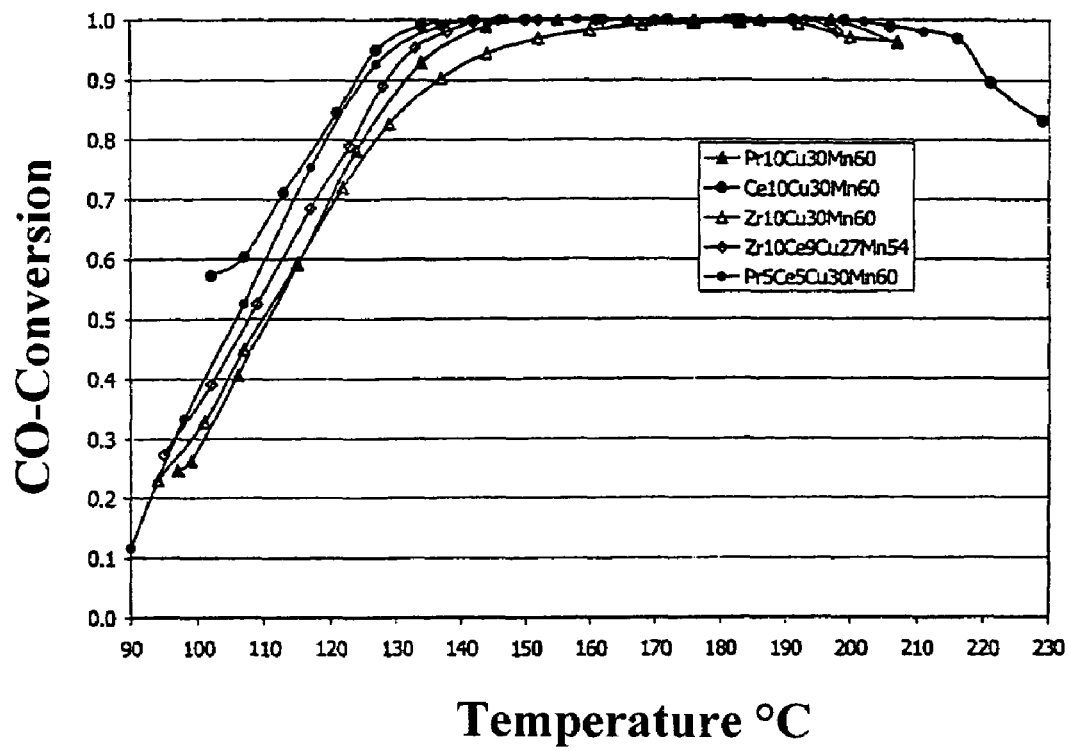
Fig. 9: The effect of partial or complete substitution of Ce in Cu/Ce/Mn mixed oxide catalysts to Pr and Zr under the same conditions as in Fig. 1

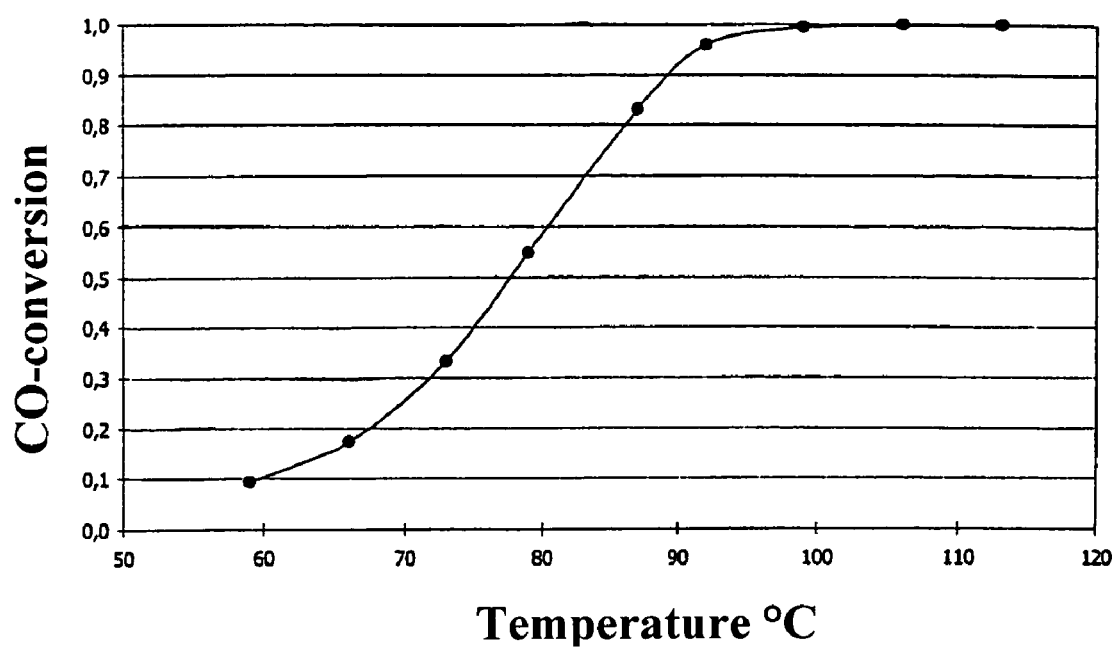
Fig. 10: CO-conversion over $La_5Ce_{10}Cu_{27.5}Mn_{57.5}$ mixed oxide catalyst at SV = 7700 $h^{-1}$ in excess oxygen (Diesel exhaust gas mixture)

CE/CU/MN-CATALYSTS

This invention relates to a mixed-oxide catalyst, which on the one hand, may be used for selective CO oxidation in hydrogen containing gas mixtures, preferably in fuel cells, and on the other hand, may be used for reduction of CO content in gas mixtures containing oxygen, e.g. in automotive or industrial exhaust gases.

Fuel cells are a future key technology, e.g. for the automotive industry, for stationary electricity and heat supply and for portable use at low power range (up to 250 W).

Fundamentally, fuel cells are much more energy-efficient than combustion engines, and they reach approximately 70-80% system efficiency (including heat utilization) in electrical power plants compared to an efficiency of 30-37% with combustion. Polymer electrolyte fuel cells (PEFC) are compact and have the advantage of high power density and low temperature operation. A significant drawback is the poisoning of electrodes (Pt, Pt/Ru) by CO, present as an impurity in the hydrogen rich gas mixtures used for the operation of fuel cells. Those gas mixtures are usually obtained by steam reforming of hydrocarbons and by water gas shift reaction. It is not possible to eliminate CO completely. The fine purification for removal of CO down to the ppm range (10 to 100 ppm) is achieved by selective oxidation after addition of a small amount of oxygen. A highly selective catalyst is required, which is able to oxidize CO completely without oxidation of hydrogen at the lowest temperatures possible.

Hitherto only noble metal catalysts have been used for this purpose. However, only few noble metal catalysts provide enough selectivity as well as activity to reduce the CO content below 10 to 100 ppm in one step. A big problem is imposed by the temperature dependency of the selectivity. The reaction, in which CO is oxidized by $O_2$ to $CO_2$ is strongly exothermic. Therefore it is difficult to keep a narrow temperature interval.

A very good noble metal catalyst often used in the USA is disclosed e.g. in U.S. Pat. No. 5,271,916. Such a catalyst has also been described by R. Farrauto in "Catal. Today" 62, (2000), 249-254. This catalyst contains 5% platinum.

A disadvantage of the catalysts in use today containing noble metals is in that they are quite expensive. Further, not all noble metal catalyst provide sufficient selectivity throughout a larger temperature interval.

There are no references on commercial application of noble metal-free catalysts for selective CO oxidation.

An extensive literature exists on the selective oxidation of CO in hydrogen rich mixtures with use of oxidation catalysts free of noble metals. For example, Cu/Mn oxidation catalysts have been disclosed by T. Ueda et al. in JP 2001000841 and by R. Imamura in JP 11104491 (Lit. 22, 23). $CuO/CeO_2$ catalysts have been described by Avgouropoulos et al. in "Catal. Lett." 73(1), (2001), 33-40, J. C. Zhang in "Chem. Lett." 9 (9), (1998), 873-876 and A. N. Shigapov et al. EUROPACAT-4, Rimini, Italy, September 1999, Book of Abstracts, 1838 (Lit. 24, 25, 26).

These catalysts show a strong temperature dependency of the selectivity, what means, that the temperature range, in which 10 to 100 ppm may be achieved, is quite narrow (about 165 to 175° C.).

The most promising catalysts are Cu/Mn— and Cu/Ce mixed oxide catalysts, but their activity in the selective oxidation of CO below 200° C. in the presence of hydrogen is still unsatisfactory.

Mixed oxide catalyst containing copper have been used also for the removal of CO from oxygen containing gas mixtures, e.g. from automotive exhaust gases or industrial exhaust gases. Their activity for oxidation of CO at temperatures below 200° C. is lower in comparison with noble metal catalysts. Some mixed oxides (hopcalite-like Cu/Mn catalysts) are vulnerable to steam and $CO_2$ in the gas mixture, i.e. in comparison with noble metal catalysts they are poisoned more easily by water vapour and $CO_2$ and therefore their activity was not sufficient for successful application as three way catalyst (TWC) or Diesel oxidation catalyst (DOC).

The mixed oxide catalysts according to the invention are characterized in that they contain about 15 to 30 at.-% Cu, about 55 to 77 at.-% Mn and about 7.5 to 10 at.-% Ce.

Surprisingly the catalysts according to the invention make it possible to reduce the CO-content of gas mixtures rich in hydrogen down to about less than 50 ppm, preferably about less than 10 ppm throughout a broad temperature interval (140° C. to 200° C.).

Further, the catalysts according to the invention are insensitive to water vapour and $CO_2$ during removal of CO from oxygen containing gas mixtures and have a low activity for undesired reactions, e.g. oxidation of sulphur to sulphates.

The Cu/Mn/Ce-mixed oxide catalyst were tested for their activity in selective CO oxidation in hydrogen-rich gas mixtures of similar composition to reformer gas. The most promising catalysts were able to oxidize CO at 145-180° C. completely without noticeable hydrogen oxidation. Therefore, such catalysts are very promising to prevent CO-poisoning of fuel cell electrodes without any substantial hydrogen oxidation. The experiments further have shown that the Cu/Mn/Ce-mixed oxide catalyst are well suited for CO-oxidation in oxygen rich gas mixtures, e.g. Diesel exhaust gases.

A preferred catalyst is characterized by the following composition: about 5 to 40 at.-% Ce, about 5 to 60 at.-% Cu, about 30 to 90 at.-% Mn; preferably about 7.5 to 10 at.-% Ce, about 15 to 30 at.-% Cu, about 55 to 77 at.-% Mn.

The most active catalysts are Cu/Mn/Ce mixed oxide catalysts, which optionally contain lanthane oxide and have the following composition:

Ce 7.5 to 10 at.-%
La 0 to 5 at.-%
Cu 15 to 30 at.-%
Mn 55 to 70 at.-%

Ce can be completely or partially (up to 90 at.-%) substituted with Pr and/or Zr. However, preferably the mixed oxide catalyst according to the invention contains cerium. Cu can be partially (up to 10 at.-%) substituted with Co, Fe, Ni, and/or Zn. In both cases activity does not decrease significantly. The addition of small amounts of alkali, alkaline earth and rare earth oxides or compounds in amounts of 0.2 to 5 at.-% increases the stability of the catalyst to reduction by hydrogen and increases the operating conditions at more than 200° C.

The catalytically active components of the catalyst according to the invention may be deposited on various carriers, preferably on zirconium oxide.

The Cu/Ce/Mn mixed oxide catalysts can be obtained in that:
(a) a precipitate is produced from salts of Cu, Mn, Ce and optionally La by co-precipitation with an alkaline precipitating agent, e.g. $NaHCO_3$ or $Na_2CO_3$, and the precipitate is dried and calcined;
(b) $MnO_2$ is impregnated with a solution of salts of Cu, Ce, and optionally La and the product such obtained is dried and calcined;

(c) a carrier, preferably zirconium oxide, is impregnated with a solution of the salts of Cu, Ce, Mn and optionally La, the salts optionally are fixed on the carrier by a precipitating agent and the product such obtained is dried and calcined.

According to method (a) they also can be obtained by co-precipitation of the nitrates of copper ($Cu(NO_3)_2 \times 3H_2O$), manganese ($Mn(NO_3)_2 \times 4H_2O$), cerium ($Ce(NO_3)_3 \times 6H_2O$) and optionally lanthanum ($LaCl_3 \times 7H_2O$), present in dissolved form, with $NaHCO_3$.

With this method the solutions of the nitrates and $NaHCO_3$ are slowly, drop-by-drop mixed together by simultaneous addition with equal rate under vigorous stirring with pH value maintained at 7.1-7.5. When precipitating with $NaCO_3$ solution, the pH should be kept in a range of 7.8 to 8.3. The obtained fine precipitate is decanted, placed onto a filter, washed with distilled water and afterwards dried at about 100° C. Finally, the precipitates are calcined under air flow (e.g. at 400° C. for 3 hours). Prior art Cu/Mn (33/67 at.-%) and Cu/Ce (15/85 at.-%) mixed oxide catalysts were prepared by the same method.

According to method (b) (impregnation method), the nitrates of copper and cerium are dissolved together in minimal amount of distilled water, and the solution obtained is used for wetness impregnation of precipitated $MnO_2$ at room temperature, followed by drying the product at about 100° C. under air flow (e.g. at 400° C. for 3 hours) and calcination.

According to method (c) the Cu/Ce/Mn carrier catalysts can be produced by wetness impregnation of the carrier, e.g. zirconia, in that the carrier is impregnated with solutions of nitrates of copper, cerium and manganese. By treatment of the impregnated carrier with a $NaHCO_3$ solution the catalytically active compounds can be fixed on the carrier as hydroxy carbonates. The products are then dried at about 100° C. under air flow (e.g. at 400° C. for 3 hours) and calcined.

The mixed oxide catalysts according to the invention are amorphous after preparation as can be derived from XRD-spectra. The calcination temperature is chosen to be lower than 500° C. and therefore a perovskite structure cannot be formed. At 400° C. $CeO_2$ appears as a first discrete mineral phase. Two very small peaks appear at 138° and 141.5°. At a temperature of 450° C. $Cu_{1.5}Mn_{1.5}O_4$ forms as the most important phase, which has a structure very different to perovskite. In this phase manganese has an oxidation state of 3⅓. This means that at least some manganese ions must be present in a higher oxidation state of +4 ($MnO_2$). Calcinations at temperatures above 500° C. leads to a complex mixture of tenorite (CuO), Cu—Mn spinel ($CuMn_2O_4$) and fluorite ($CeO_2$).

In the mixed oxide catalyst according to the invention a defined amount (5-15%) of a metal in an oxidation state +4 (cerium) is homogeneously dispersed in a mixed oxide of Cu/Mn. This results in a very efficient and selective oxidation catalyst.

The catalysts were tested in a U-shaped packed-bed flow reactor (in the form of a quartz glass tube). An electric furnace was used to heat the reactor. The temperature was monitored by a thermocouple placed in the centre of the catalyst bed. A powdered or "as prepared" sample (catalyst loading 200 mg diluted with 1 cm³ quartz sand) was filled into the reactor. A feed gas mixture of the following composition was fed over the catalyst:

(a)
0.6 vol.-% CO
0.9 vol.-% $O_2$
28.5 vol.-% $H_2O$
14.5 vol.-% $CO_2$
52.0 vol.-% $H_2$
3.5 vol.-% $N_2$ (methane reforming gas mixture after water gas shift reaction) or a gas mixture of the following composition:

(b)
0.6 vol.-% CO
10.0 vol.-% $O_2$
5.3 vol.-% $H_2O$
6.4 vol.-% $CO_2$
balance $N_2$ This gas mixture corresponds to a Diesel exhaust gas mixture.

A conventional flow setup was used for gas mixture preparation. All gases were of ultra high purity. The flow rates were controlled using mass flow controllers (MKS, Munich, Germany). To prevent water condensation, all connections were installed in a thermobox maintaining constant temperature of 100° C. Reactor effluents were analysed with a HP 6890A gas chromatograph, using Porapack Q und NaX capillary columns. The results are displayed in FIGS. 1 to 10.

FIG. 1 is an illustration of the performance of Cu/Ce/Mn mixed oxide catalyst relative to the performance of binary Cu/Mn and Cu/Ce catalyst (prior art) in a gas mixture of composition (a) at space velocities SV=7500–7800 h$^{-1}$.

FIG. 2 presents the CO-oxidation activity of Cu/Ce/Mn mixed oxide catalysts with constant Ce-concentration (10 at.-%) and different Cu/Mn ratios under the same conditions as in FIG. 1.

FIG. 3a shows the optimisation of the Ce content in the Cu/Ce/Mn mixed oxide catalyst at a fixed Cu/Mn ratio of 0.5 under the same conditions as in FIG. 1.

FIG. 3b shows Cu/Ce/Mn/La-catalysts precipitated with $NaHCO_3$ in comparison to catalysts precipitated with $Na_2CO_3$. Further the influence of the calcination temperature can be detected.

FIG. 4 illustrates the performance of Cu/Ce/Mn catalysts with the same composition which were prepared by different methods. A catalyst of 10 at.-% Ce, 30 at.-% Cu, 60 at.-% Mn was prepared by co-precipitation of the nitrates with $NaHCO_3$ according to the method described above, while a further Cu/Ce/Mn catalyst was prepared by impregnation of $MnO_2$ with copper and cerium nitrate at an atom proportion Cu/Ce/Mn of 30/10/60. The reaction conditions were the same as in FIG. 1.

FIG. 5. reveals the activity of mixed oxide catalysts with 30 at.-% Cu, 10 at.-% Ce and 60 at.-% Mn supported on a $ZrO_2$ carrier having a BET surface of about 40 m²/g (obtained from Johnson-Matthey) with the same reaction mixture as in FIG. 1 and with a space velocity SV=2300 h$^{-1}$. The supported catalyst contained about 20 wt.-% active catalyst components.

FIG. 6 presents the CO-oxidation activity of catalysts containing 1.2 at.-% Na, 30 at.-% Cu, 10 at.-% Ce and 58.8 at.-% Mn, and a catalyst containing 0.6 at.-% K, 30 at.-% Cu, 10 at.-% Ce and 59.4 at.-% Mn in comparison with the activity of a catalyst containing 30 at.-% Cu, 10 at.-% Ce and 60 at.-% Mn, wherein the reaction conditions were the same as in FIG. 1.

FIG. 7 presents the activity of a catalyst containing 2.5 at.-% Sr, 30 at.-% Cu, 7.5 at.-% Ce and 60 at.-% Mn, of a catalyst containing 2.5 at.-% Ba, 30 at.-% Cu, 7.5 at.-% Ce and 60 at.-% Mn, as well as a catalyst containing 5 at.-% La, 10 at.-% Ce, 27.5 at.-% Cu and 57.5 at.-% Mn in the form of mixed oxides in comparison to the activity of a mixed oxide catalyst containing 30 at.-% Cu, 10 at.-% Ce and 60 at.-% Mn, wherein the reaction conditions were the same as in FIG. 1.

FIG. 8 illustrates the activity of catalysts with partial exchange of copper to other transition metals (Co, Fe, Ni, Zn and Cr) under the same reaction conditions as in FIG. 1.

FIG. 9 shows a catalyst, in which Ce has been substituted, partially or completely, by Pr or Zr, respectively, under the same reaction conditions as in FIG. 1.

FIG. 10 presents the activity of Cu/Ce/Mn/La mixed oxide catalysts for CO oxidation in Diesel exhaust gases. A gas mixture of composition (b) at space velocities SV of 7700 h$^{-1}$ was used.

The results demonstrate that the addition of ceria to Cu/Mn mixed oxide catalysts leads to much higher activity in selective CO oxidation (compared to the activity of Cu/Mn and Cu/Ce systems) under H$_2$-rich conditions and at low temperatures. The Cu/Ce/Mn mixed oxide catalyst has shown a synergistic effect in comparison with pure oxides and binary Cu/Mn and Cu/Ce catalysts. As can be derived from FIG. 1, the Cu/Mn hopcalite-like catalyst is active at temperatures exceeding 100° C., but complete CO oxidation was only obtained at 190° C., while catalyst reduction was observed near 200° C. As a result, binary Cu/Mn catalysts tend to have a very narrow range of temperatures for selective CO oxidation in hydrogen-rich mixtures. The Cu/Ce catalyst was found to be less active and even at 200° C., it was not able to oxidize CO completely.

In contrast, the Cu/Ce/Mn mixed oxide catalyst according to the invention reached significant activity even at temperatures below 100° C. (see in FIG. 1). Complete CO oxidation was obtained at 145° C., while H$_2$ oxidation was negligible. This demonstrates that Cu/Ce/Mn mixed oxide catalysts remove CO selectively at lower temperatures compared to binary oxides (at 145° C.-200° C.).

As can be seen in FIGS. 2 and 3, the ternary Cu/Ce/Mn mixed oxide catalyst could be optimised at a ceria concentration of 7.5 to 10 at.-%, with 15 to 30 at.-% of Cu, the balance being Mn oxide.

The inventors are not willing to be bound to any particular theory to explain the nature of synergy between these three oxides, but the addition of small amounts of ceria may stabilize Cu and Mn in a higher oxidation state, while ceria is working as an "oxygen pump" for other oxides. The dispersion of Cu also can be improved by ceria addition. High ceria concentrations, however, lead to lower activity due to the low activity of ceria (CeO$_2$) itself.

The said Cu/Ce/Mn mixed oxide catalysts may be prepared in different ways. However, most preferred is a co-precipitaiton method using NaHCO$_3$ as precipitating agent and impregnation of MnO$_2$ with Cu and Ce containing salts. As shown in FIG. 4, the samples prepared by these two methods with the same composition, have high and comparable activity.

The Cu/Ce/Mn-catalysts according to the invention may be used as prepared or it may be deposited on different supports, such as alumina, silica or zirconium dioxides. Ceria is less preferred. The best activity was observed for a Cu/Ce/Mn catalyst supported on ZrO$_2$. The activity of this supported catalyst is shown in FIG. 5. Zirconia may stabilize the higher valence state of Mn, which is soluble in the lattice of ZrO$_2$. In addition, the introduction of Zr to a Cu/Ce/Mn mixed oxide catalyst does not decrease the activity, as can be seen from FIG. 9.

Different coating methods to load the Cu/Ce/Mn mixed oxide catalyst onto a carrier can be applied, including impregnation, deposition-precipitation, slurry approach, etc.

Furthermore, the catalyst may be modified with the small amounts of oxides of basic nature, including alkali, alkaline earth and rare-earth oxides to improve its resistance to reduction by hydrogen at temperatures above 200° C. aiming to increase the temperature range of the catalyst operation. As can be taken from FIG. 6, the addition of small amounts of alkali compounds increase the performance of catalyst near and above 200° C. for quaternary oxides, while for the ternary Cu/Ce/Mn mixed oxide catalyst, carbon monoxide appeared again at temperatures above 200° C. The addition of alkaline earth and rare earth metals (La), see FIG. 7, gives a less pronounced effect, but also allows the improvement of the catalyst performance at increased temperatures. The above mentioned components do not increase the activity and decrease it at higher loading.

It also has been found that part of Cu in the catalyst composition may be replaced with other transition metals, namely Co, Fe, Zn, Ni, as shown in FIG. 8, leading to the same activity or to a minimal decrease of activity, while the addition of Cr suppressed the low-temperature activity of the catalyst.

In a similar way, it has been found that part of Ce can be successfully substituted to praseodymium and/or zirconium. In this case the zirconium is introduced into the lattice (see FIG. 9), not however when used as a carrier (see FIG. 5). Complete substitution of cerium, however, decreased the activity, as can be seen in FIG. 9.

The amount of ceria in the mixed oxide catalyst according to the invention is of high importance. The use of ceria is known in Three way catalysts containing noble metals because of its oxygen storing ability. This is caused by an alteration of the oxidation state between Ce(IV) and Ce(III).

The catalysts according to the invention are also very active for removal of CO under oxygen-excess conditions as well as in the presence of CO$_2$ and H$_2$O. Such gas compositions are typical for Diesel exhaust gases. As can be taken from FIG. 10, the complete CO oxidation was achieved at 100° C. using the Cu/Ce/Mn mixed oxide catalyst, and the CO concentration was only 10 ppm at SV=110000 h$^{-1}$ at the reaction temperature of 145° C. Therefore, this rather low priced catalyst is very promising for CO removal under automotive conditions. Its activity is comparable with Pt(Pd) containing catalysts, which are used for automotive applications, but which are poisoned by sulphur compounds quite easily.

Summary

Disclosed is a mixed oxide catalyst, preferably for selective oxidation of CO in hydrogen rich gas mixtures, or in oxygen containing gas mixtures in the presence of water and carbon dioxide, comprising about 15 to 30 at.-% Cu, about 55 to 77 at.-% Mn and about 7.5 to 10 at.-% Ce.

The invention claimed is:

1. Mixed oxide catalyst, preferably for selective oxidation of CO in hydrogen rich gas mixtures, or in oxygen containing gas mixtures in the presence of water and carbon dioxide, comprising about 15 to 30 at.-% Cu, about 55 to 77 at.-% Mn and about 7.5 to 15 at.-% Ce.

2. The catalyst of claim 1, wherein the quantity of the Ce is from 7.5 to 10 at.%.

3. A process for producing the mixed oxide catalyst of claim 1 for selective oxidation of CO in a hydrogen-rich gas mixture or in an oxygen-containing gas mixture in the presence of water and carbon dioxide comprising
preparing a salt solution of Cu, Mn and Ce comprising, based on the total amount of Cu, Mn- and Ce-salts, from about 15 to about 30 at. % Cu, from about 55 to 77 at.-% Mn and from about 7.5 to 15 at.-% Ce,
preparing a precipitate by co-precipitation of said salt solution of Cu, Mn and Ce with an alkaline precipitating agent, and
drying and calcining the precipitate.

4. The process of claim 3, wherein a salt of La is co-precipitated with salts of Cu, Mn and Ce.

5. The process of claim 3, wherein the precipitating agent is selected from $NaHCO_3$, $Na_2CO_3$ and mixtures thereof.

6. A process for producing the mixed oxide catalyst of claim 1 for selective oxidation of CO in a hydrogen-rich gas mixture of in an oxygen-containing gas mixture in the presence of water and carbon dioxide comprising
preparing a carrier compound of $MnO_2$,
impregnating the carrier with a salt solution of Cu and Ce, said amount of $MnO_2$ and Cu- and Ce-salts being selected such that a precipitate obtained comprises, based on the total amount of Cu, Mn- and Ce-salts, from about 15 to 30 at.-% Cu, from about 55 to 77 at.-% Mn and from about 7.5 to 15 at.-% Ce, and
drying and calcining the precipitate.

7. The process of claim 6, wherein the salt solution further comprises a salt of La.

8. A process for the production of the mixed oxide catalyst of claim 1 for selective oxidation of CO in a hydrogen-rich gas mixture or in an oxygen-containing gas mixture in the presence of water and carbon dioxide comprising
preparing a carrier comprised of $ZrO_2$,
impregnating that carrier with a salt solution of Cu, Ce and Mn comprising, based on the total amount of Cu, Mn- and Ce-salts, from about 15 to 30 at.-% Cu, from about 55 to 77 at.-% Mn and from about 7.5 to 15 at.-% Ce, and
drying and calcining the impregnated carrier.

9. The process of claim 8, wherein the carrier is further impregnated with a salt solution of La.

10. The process of claim 8, wherein the salts are fixed on the carrier by use of a precipitating agent.

11. A mixed oxide catalyst for selective oxidation of CO in a hydrogen-rich gas mixture or in an oxygen-containing gas mixture in the presence of water and carbon dioxide comprising from about 5 to about 60 at.% Cu, from about 30 to about 90 at.% Mn and from about 5 to about 15 at.% Ce.

12. The catalyst according to claim 11 further comprising from about 2 to about 5 at.-% La in the form of $La_2O_3$.

13. The catalyst according to claim 11 further comprising from about 0.2 to about 5 at.% of a metal selected from the group consisting of alkali, alkaline earth, rare earth, and mixtures thereof in the form of oxides or other compounds.

14. The catalyst of claim 11, wherein up to about 10 at.% of the Cu is replaced by a metal selected from the group consisting of cobalt, iron, nickel, zinc and mixtures thereof.

15. The catalyst of claim 11, wherein a portion of the Ce is replaced by a metal selected from the group consisting of zirconium, praseodymium and mixtures thereof.

16. The catalyst of claim 11 further comprising a carrier.

17. The catalyst of claim 16 wherein the carrier is comprised of $ZrO_2$.

18. A process for producing the mixed oxide catalyst of claim 11 for selective oxidation of CO in a hydrogen-rich gas mixture or in an oxygen-containing gas mixture in the presence of water and carbon dioxide comprising
preparing a salt solution of Cu, Mn and Ce comprising, based on the total amount of Cu, Mn- and Ce-salts, from about 5 to about 60 at.-% Cu, from about 30 to 90 at.-% Mn and from about 5 to 15 at.-% Ce,
preparing a precipitate by co-precipitation of said salt solution of Cu, Mn and Ce with an alkaline precipitating agent, and
drying and calcining the precipitate.

19. The process of claim 18, wherein a salt of La is co-precipitated with the salts of Cu, Mn and Ce.

20. The process of claim 18, wherein the precipitating agent is selected from $NaHCO_3$, $Na_2CO_3$ and mixtures thereof.

21. A process for producing the mixed oxide catalyst of claim 11 for selective oxidation of CO in a hydrogen-rich gas mixture or in an oxygen-containing gas mixture in the presence of water and carbon dioxide comprising
preparing a carrier compound of $MnO_2$,
impregnating the carrier with a salt solution of Cu and Ce, said amounts of $MnO_2$ and Cu- and Ce-salts being selected such that a precipitate obtained comprises, based on the total amount of Cu, Mn- and Ce-salts, from about 5 to 60 at.-% Cu, from about 30 to 90 at.-% Mn and from about 5 to 15 at.-% Ce, and
drying and calcining the precipitate.

22. The process of claim 21, wherein the salt solution further comprises a salt of La.

23. A process for the production of the mixed oxide catalyst of claim 11 for selective oxidation of CO in a hydrogen-rich gas mixture or in an oxygen-containing gas mixture in the presence of water and carbon dioxide comprising
preparing a carrier comprised of $ZrO_2$,
impregnating that carrier with a salt solution of Cu, Ce and Mn comprising, based on the total amount of Cu, Mn- and Ce-salts, from about 5 to 60 at.-% Cu, from about 30 to 90 at.-% Mn and from about 5 to 15 at.-% Ce, and
drying and calcining the impregnated carrier.

24. The process of claim 23, wherein the carrier is further impregnated with a salt solution of La.

25. The process of claim 23, wherein the salts are fixed on the carrier by use of a precipitating agent.

26. The catalyst of claim 11, wherein the quantity of Ce is from 5 to 10 at.-% Ce.

* * * * *